US006879672B2

(12) United States Patent
Broussard et al.

(10) Patent No.: US 6,879,672 B2
(45) Date of Patent: Apr. 12, 2005

(54) TELECOMMUNICATIONS SERVICE EXTENSIONS

(75) Inventors: Scott J. Broussard, Cedar Park, TX (US); Michael John Walker, Austin, TX (US); Eduardo N. Spring, Round Rock, TX (US); Mark A. Sehorne, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 09/951,954

(22) Filed: Sep. 13, 2001

(65) Prior Publication Data

US 2003/0048891 A1 Mar. 13, 2003

(51) Int. Cl.[7] .............................................. H04M 3/42
(52) U.S. Cl. ........................ 379/201.03; 379/201.01; 379/149
(58) Field of Search ................... 379/100.01, 201.01

(56) References Cited

U.S. PATENT DOCUMENTS 5,764,639 A * 6/1998 Staples et al. ............. 370/401
6,028,917 A * 2/2000 Creamer et al. ......... 379/100.01
6,282,281 B1 * 8/2001 Low ........................... 379/230

OTHER PUBLICATIONS

"The JAIN™ APis: Integrated Network APis for the Java™ Platform" Jun. 2001.

* cited by examiner

Primary Examiner—Ahmad F. Matar
Assistant Examiner—Karen Le
(74) Attorney, Agent, or Firm—John R. Biggers; Mark S. Walker; Biggers & Ohanian, LLP

(57) ABSTRACT

A method of extending telecommunications service, wherein the method is implemented in an extension application server. The extension application server is coupled for data communications to a customer data source and to a telecommunications server. The telecommunications server includes, installed and operating upon the telecommunications server, a multiplicity of telecommunications extension services. The method of extending telecommunications service includes receiving, in the extension application server, from a requesting telecommunications extension service in the telecommunications server, a telecommunications service request; preparing, in dependence upon information from the customer data source, a response to the telecommunications service request; and transmitting the response to the requesting telecommunications extension service.

21 Claims, 5 Drawing Sheets

TELECOMMUNICATIONS SERVICE EXTENSIONS

BACKGROUND OF THE INVENTION

1. Field of the Invention

The field of the invention is telecommunications systems architecture, or, more specifically, methods, systems, and products for expanding telecommunications services beyond the capabilities of the Public Switched Telephone Network.

2. Description of the Related Art

The Public Switched Telephone Network, or "PSTN," provides what is sometimes called in the industry, "POTS," or Plain Old Telephone Service, that is, just phone calls, not call forwarding, no call waiting, no Call Screener Service, no Follow Me Service, just Plain Old Telephone Service. Modem telecommunications services aim to improve on POTS, and some of the more modem services do so by tailoring their service to specific customer requirements. In order to tailor a service to a specific customer requirement, a service needs access to specific customer information, information often stored in a customer location rather than being stored in a location more central to a service.

There is some tension, however, between the need for access to remotely stored customer-specific information and access to information in a central database of a telecommunications service. If a telecommunications service is expanded to acquire direct access to remote customer databases, such expansions risk intermingling customer functionality with telecommunications functionality so as to increase security risks for the central telecommunications databases. It would be advantageous, therefore, to have a way of expanded telecommunications services that require access to remotely available customer specific information in a fashion that is modular, portable, scalable, extensible, and secure.

SUMMARY OF THE INVENTION

Typical embodiments of the invention include a method of extending telecommunications service which includes receiving in the extension application server, a telecommunications service request from a requesting telecommunications extension service in the telecommunications server; Typical embodiments also include preparing, in dependence upon information from the customer data source, a response to the telecommunications service request; and transmitting the response to the requesting telecommunications extension service. In typical embodiments, the method is implemented in an extension application server. The extension application server is coupled for data communications to a customer data source, as well as to a telecommunications server. In typical embodiments, the telecommunications server includes a multiplicity of telecommunications extension services, installed and operating upon the telecommunications server.

In typical embodiments of the invention, the telecommunications server is coupled for data communications to a common repository database. In typical embodiments, the common repository database comprises information describing telecommunications services associated with telephone numbers, and the common repository database further includes communications parameters for extension application servers associated with telecommunications extension services.

In typical embodiments of the invention, the telecommunication extension service is a Call Screener Service and the customer data source includes a user workstation in a customer installation. In typical embodiments, the telecommunication extension service is a Follow Me Service and the customer data source includes a Lotus Notes Calendar Database in a customer installation. In typical embodiments the telecommunications server is a SLEE server.

Typical embodiments of the invention also include downloading the extension application server from a web provisioning server. Typical embodiments further include communicating, from the extension application server to a web provisioning server, data communications parameters for the extension application server, wherein the data communications parameters are stored in the common repository database.

The foregoing and other objects, features and advantages of the invention will be apparent from the following more particular description of exemplary embodiments of the invention, as illustrated in the accompanying drawings wherein like reference numbers represent like parts of the invention.

DETAILED DESCRIPTION OF EXEMPLARY EMBODIMENTS

Introduction

Figure 1:
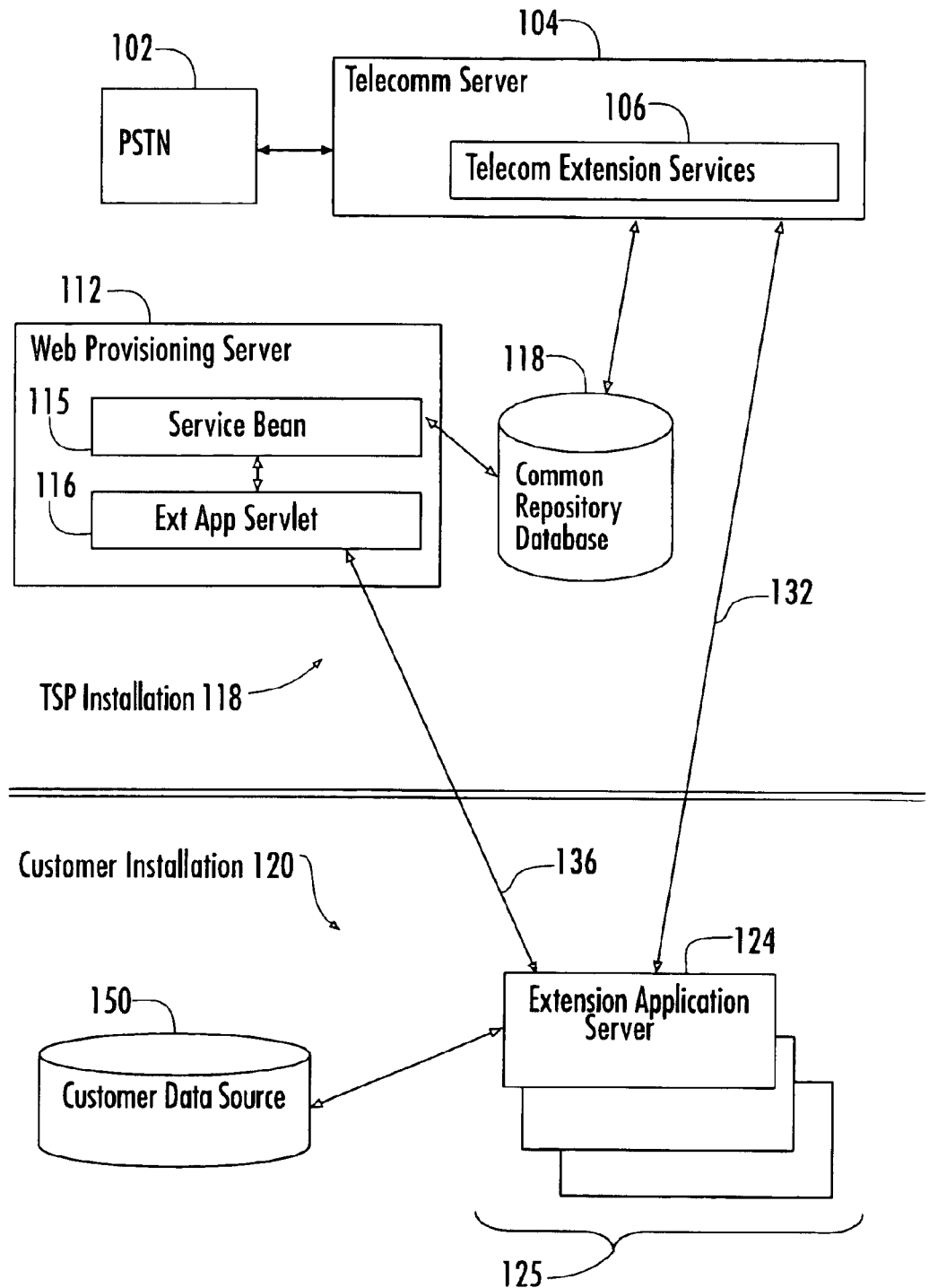
FIG. 1 is a block diagram illustrating an example embodiment of the invention.

The present invention is described primarily in terms of methods for expanding telecommunications services beyond the capabilities of the Public Switched Telephone Network. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the following terms are used as defined here. Other terms are defined elsewhere in the specification and used as defined.

"Browser" means a web browser, a software application for locating and displaying web pages. Typical browsers today can display text, graphics, audio and video.

A "Call Screener Service" is a telecommunications service that notifies a user's desktop computer when an incoming phone call occurs to ask whether the call should be accepted or rejected. That is, a Call Screener Service in typical embodiments queries a common repository database to determine whether the service is invoked and if so which extension application server supports it for the destination phone number. Then the Call Screener Service passes a service request to the extension application server which accesses a customer-side database tying destination phone numbers to customer-side LAN locations for user workstations and sends a message to the user at the user's workstation to accept or reject the incoming call.

"Coupled for data communications" means any form of data communications, wireless, infrared, radio, internet protocols, HTTP protocols, email protocols, networked, direct connections, dedicated phone lines, dial-ups, and other forms of data communications as will occur to those of skill in the art.

In this specification, the terms "field," "data element," and "attribute" are used as synonyms, referring to individual elements of digital data. An aggregation of data elements are referred to as a "record" or a "data structure." An aggregation of records is referred to as a "database." Definitions of complex data structures that include member methods, functions, or software routines in addition to data elements are referred to as "classes." An instance of a complex data structure is referred to as an "object" or a "class object."

A "Follow Me Service" is a telecommunications service that uses a destination phone number of an incoming telephone call to index into databases to determine whether the destination phone subscribes to a Follow Me Service, and if so, then where the incoming phone call should follow. A Follow Me Service augments the usual call forwarding service in that the Follow Me Service has the capability of discovering an extension application server on a client installation and accessing customer-side calendar databases to find the following phone for the destination phone. In Follow Me Services, therefore, the user typically is not required to notify the telecommunications service of the follow number. Instead, the user simply types the phone number of a meeting location into the user's usual calendaring systems, Lotus Notes or Microsoft Outlook, and the extension application server, upon request from the telecommunications server, advises the telecommunications server to forward the incoming phone call to the follow number, that is, the phone number in the room where the meeting is held, according to the user's calendar.

"JAIN," a trademark of Sun Microsystems, is "Java Integrated Networks." Sun Microsystems supports a 'JAIN initiative,' an industry effort to develop de facto standards for integrated telecommunications networks. The JAIN initiative aims to develop APIs for integrated networks, including protocol APIs for interfaces to wire line, wireless, and IP signaling protocols; and application APIs for service creation within Java frameworks spanning all subsidiary protocols covered by JAIN protocol APIs. The JAIN initiative and JAIN APIs for integrated networks are described in detail in a white paper from Sun Microsystems, Inc., 901 San Antonio Road, Palo Alto, Calif. 94303. The white paper is entitled *The JAIN APIs: Integrated Network APIs for the Java Platform*. The white paper is available at the URL: http://java.sun.com/products/jain/. The white paper is incorporated by reference into this specification.

A "JavaBean" is a software element implementing a specification developed by Sun Microsystems that defines how Java objects interact. An object that conforms to this specification is called a JavaBean. JavaBeans are similar to an ActiveX controls in that a JavaBean can be used by any application that understands the JavaBeans format. JavaBeans are dissimilar to ActiveX controls in that: ActiveX controls can be developed in any programming language but can execute only on Windows platforms. JavaBeans can be developed only in Java but can run on any platform.

The term "network" is used in this specification to mean any networked coupling for data communications. Examples of networks useful with the invention include intranets, extranets, internets, local area networks, wide area networks, and other network arrangements as will occur to those of skill in the art.

"Network address" means any network address useful for data communications. Network addresses useful with various embodiments of the invention include local internet protocol addresses, private internet protocol addresses, and temporary Internet addresses assigned to a web client by a DHCP server, and permanent, official registered Internet addresses associated with domain names.

A "servlet" is, in effect, an applet that runs on a server. Which is to say, that a servlet is an element of application software designed to be executed from within a server rather than having the ability to execute independently from an operating system. Servlets have a similar relationship to servers as applets have to browsers. The term 'applet' usually refers to a Java applet that executes from within a Web browser. The term 'servlet' usually refers to a Java servlet that executes from within a Web server environment. Java servlets are often used as an alternative to Common Gateway Interface or CGI programs. The biggest difference between the two is that a Java applet is persistent When a servlet is started, it stays in memory and can fulfill multiple requests. In contrast, a CGI program terminates when it has fulfilled a request. The persistence of Java applets makes them faster because there's no wasted time in setting up and tearing down a servlet process.

A "SLEE server" is a server operating portable telecommunication services and application frameworks in a JAIN SLEE compliant execution environment. SLEE servers in typical embodiments of the present invention are implemented in JAVA using the JTAPI, the Java Telephony API. "JAIN SLEE," or the JAIN Service Logic Execution Environment, an element of Sun Microsystems' industry-oriented de facto standard JAIN initiative, is a set of interfaces and standards for telecommunications and Internet operations within carrier grade telecommunications networks and Internet networks. JAIN-compliant telecommunications services are tested and deployed in the JAIN Service Logic Execution Environment.

"URL" means Uniform Resource Locator, a standard method of associating World Wide Web data locations with network addresses for data communications.

"World Wide Web," or more simply "the web," refers to the well-known system of internet protocol ("IP") servers that support specially formatted documents, documents formatted in a language called "HTML" for HyperText Markup Language. The term "Web" is used in this specification also to refer to any server or connected group or interconnected groups of servers that implement the HyperText Transport Protocol, "HTTP," in support of URLs and HTML documents, regardless whether such servers or groups of servers are coupled to the World Wide Web as such.

DETAILED DESCRIPTION

Turning now to FIG. 1, a first example embodiment of the invention is illustrated as a system for extending telecommunications services, the system including a telecommunications server (104) coupled for data communications to an extension application server (124), wherein the telecommunications server is in turn coupled for data communications to a Public Switched Telephone Network (102). The telecommunications server comprises telecommunications extension services. In the example embodiment of FIG. 1, the extension application sever is coupled for data communications to a customer data source (150) and also to a web provisioning server (112). Both the web provisioning server and the telecommunications server are coupled for data communications to a common repository database.

In operation, upon the occurrence of a telecommunications event, such as, for example, an incoming phone call from the PSTN, in embodiments of the kind shown in FIG. 1, the telecommunications server typically reads from the common repository data base information regarding the destination phone number for the incoming phone call, determines whether an extension application server is active for a telecommunications service, and communicates a service requests (132) from the telecommunications server to an extension application server. The extension application server then formulates a response to the service request in dependence upon information retrieved from a customer data source (150). As illustrated in FIG. 1, many application extension servers (125) can provide information from a single customer data source, with selection among the many applications servers for a particular service request being made in dependence upon data communications load balancing algorithms.

Figure 2:
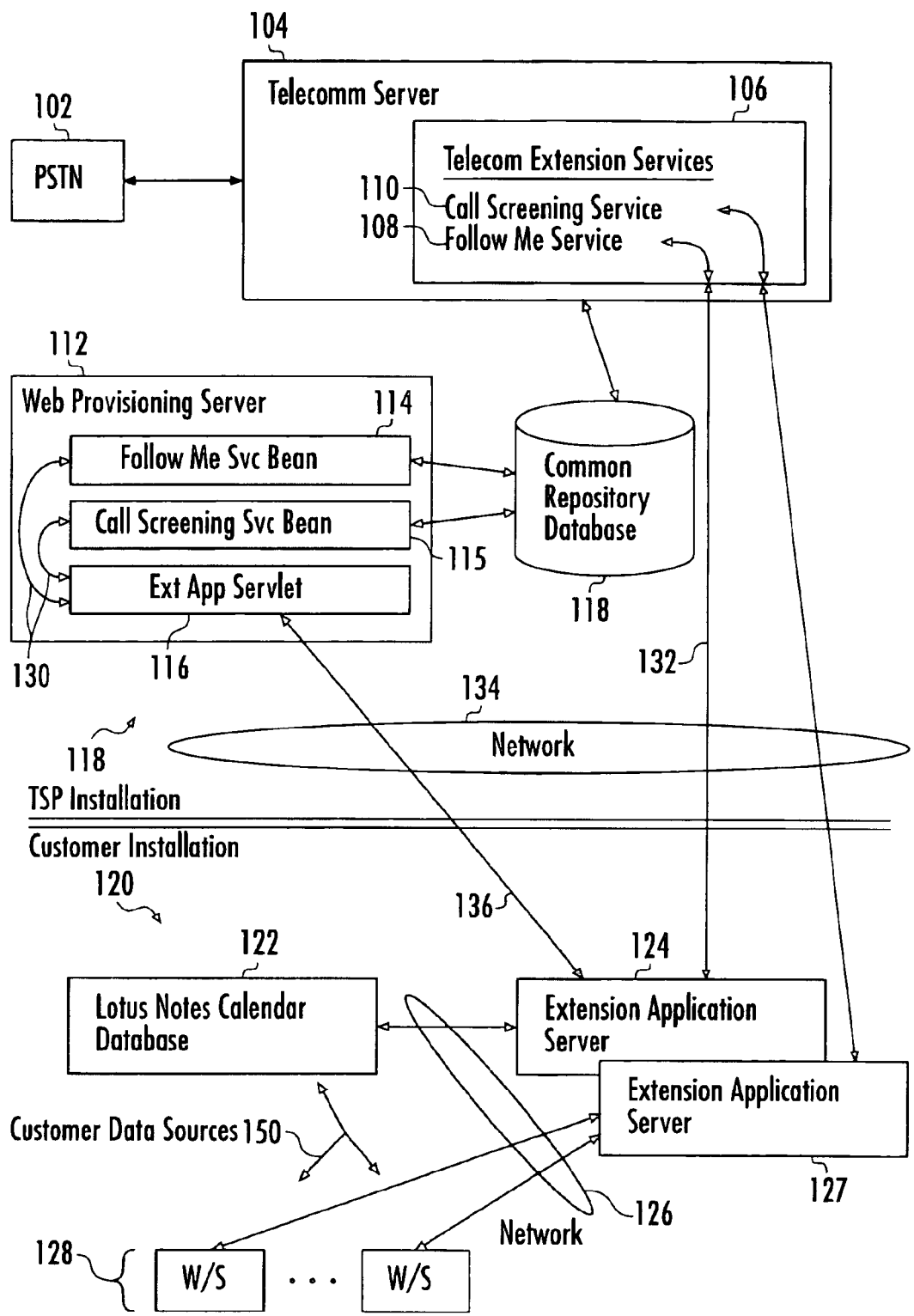
FIG. 2 is a block diagram illustrating a more detailed example embodiment of the invention.

FIG. 2 illustrates more detailed embodiments of systems for extending telecommunications services. In typical embodiments of the kind illustrated in FIG. 2, the telecommunications server (104) is a SLEE server, and the telecommunications extension services include services such as, for example, call forwarding services, call waiting services, Call Screener Services, and Follow Me Services. The telecommunications extension services include any telecommunications service extending POTS. Many such additional services will occur to those of skill in the art, and the installation and use of all of them in a telecommunications server useful in embodiments of the present invention is well within the scope of the present invention.

In typical embodiments of the kind illustrated in FIG. 2, the web provisioning server (112) provides downloads to customer installations of instances of extension application servers (124). At startup time for an extension application server, the extension application server communicates to a web provisioning server communications parameters for the extension application server, which communications parameters are then stored in the common repository database (118). The extension application server communicates to the web provisions server through an extension application servlet (116) dedicated to data communications with extension application servers. The extension application servlet in turn communicates the communications parameters of the extension application server to the common repository database (118) through a JavaBean (114, 115). In typical embodiments of the kind illustrated in FIG. 2, there is one JavaBean dedicated to web provisioning services for each telecommunications extension service (106). In the particular example of FIG. 2, where there are illustrated two example telecommunications extension services (110, 108), there are two JavaBeans (114, 115) in the web provisioning server (112).

Figure 5:
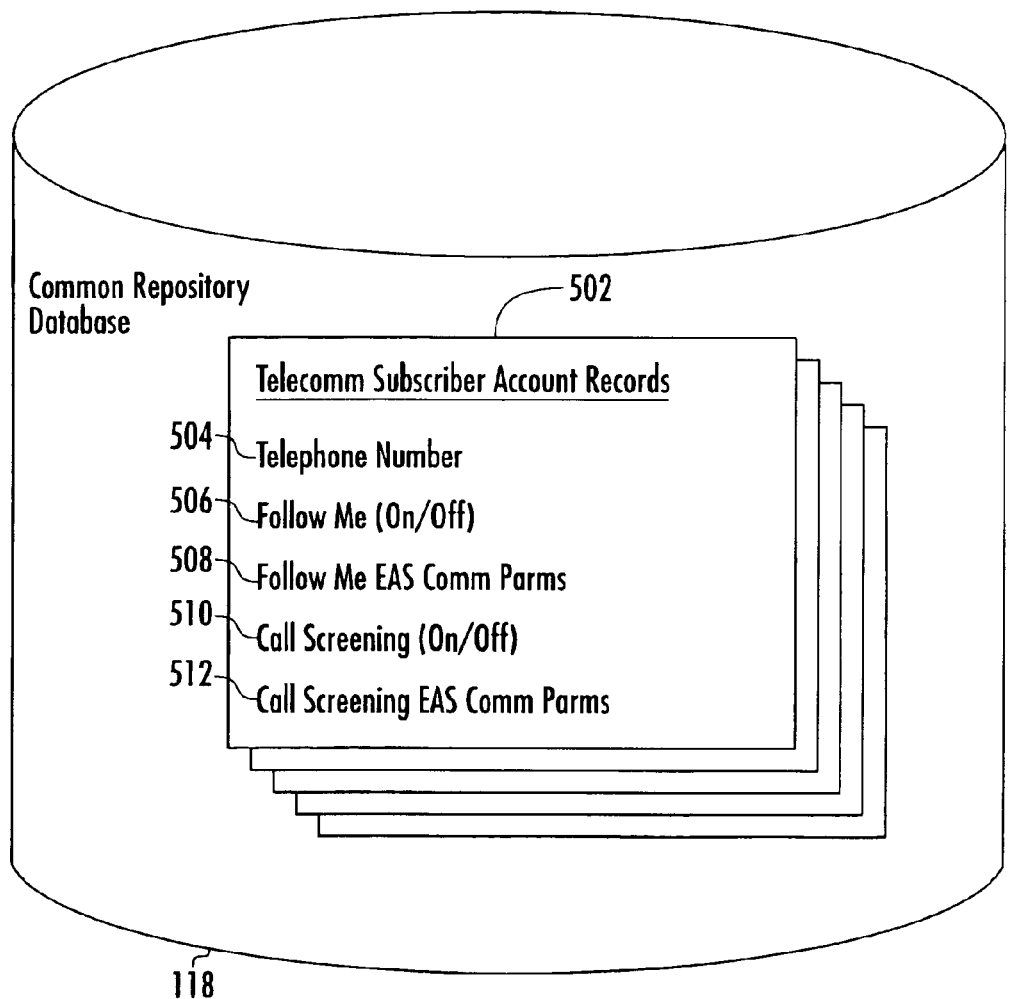
FIG. 5 is an example data structure illustrating a kind of data structure useful in various embodiments of the invention to embody telecommunications subscribers account records.

FIG. 5 illustrates an example embodiment of a data structure useful as a telecommunications subscriber account record (502) in a common repository database (118). Data communications parameters (508, 512) for extension application servers include network addresses, port numbers, and time outs. Data communication parameters include other data elements as will occur to those of skill in the art. The exact form of the data storage in a common repository database will vary among embodiments. Any form of database storage of user account information, phone numbers, telecommunications extension service status, and communications parameters for extension application servers, as will occur those of skill in the art, is well within the scope of the present invention.

FIG. 2 also illustrates an embodiments in which multiple extension application servers (124, 127) operative in a customer installation are dedicated to particular telecom extension services (108, 110). In particular, the example extension application server (124) is dedicated to a Follow Me Service (108). In this example, a user notes in the user's Lotus Notes Calendar, a note stored in the customer's Lotus Notes Calendar Database (122), that the user is scheduled to attend a meeting at a particular time and location having a particular meeting room telephone number. The user's office telephone number has an indication in the user's account record in the common repository database the Follow Me Service is active for the user. When an incoming phone call arrives for the user's office telephone while the user is in the meeting, the extension application server (124) retrieves from the Lotus Note Calendar Database (122) the meeting room telephone number and returns it in a response to the Follow Me Service (108). The Follow Me Service then rings the user in the meeting room. The extension application server (124) is programmed to accept service requests from Follow Me Services and respond with information retrieved from customer data sources such as Lotus Notes Calendar Databases, that is, customer data sources having data useful in following a user to an alternative telephone number. Lotus Notes Calendar Databases are mentioned only for illustration, not for limitation. Any calendar database capable of storing alternative phone numbers is useful with various embodiments of the present invention.

Similarly, as shown in FIG. 2, another of the multiple extension application servers (127) is dedicated to providing responses to service requests from Call Screener Services (110). The extension application server (127) is programmed to respond to service requests from Call Screener Services by, for example, asking a user, through a dialog box displayed on the user's workstation (128), whether a user wishes to accept an incoming phone call. By programming extension application servers for dedication to particular telecommunications extension services, each extension application server remains compact, portable, and fast. Moreover, resources are used efficiently, because the overall extension service is automatically scaled: The customer installation installs and runs only those extension application servers that are actually needed for active extension services.

Figure 3:
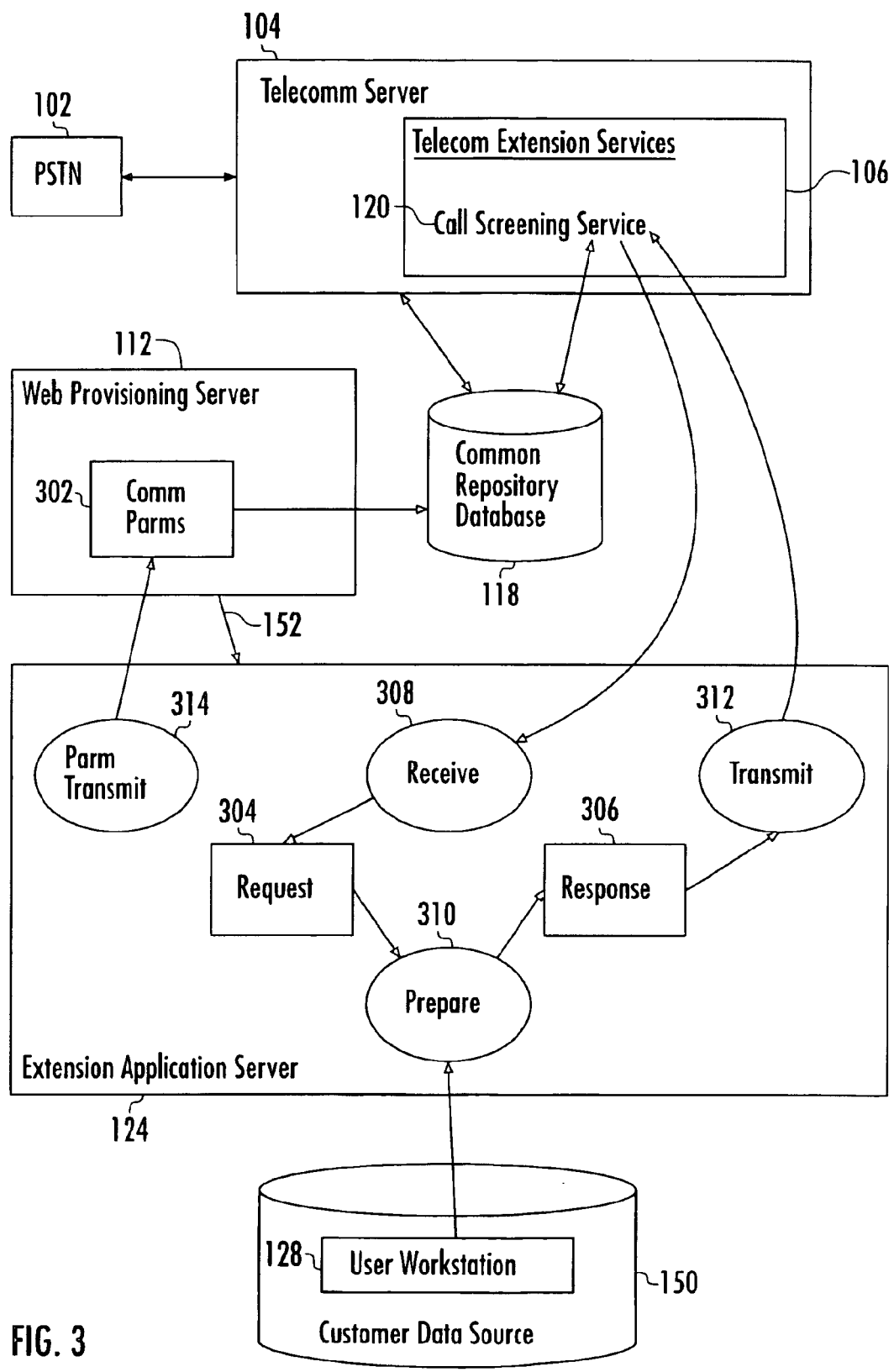
FIG. 3 is a control flow diagram showing an example embodiment of the method aspect of the invention with particular attention to a Call Screening Service as an example of a telecommunications extension service.

Turning now to FIG. 3, typical embodiments of the invention are seen illustrated as methods of extending telecommunications service, including receiving (308), in an extension application server, from a requesting telecommunications extension service (120) in the telecommunications server, a telecommunications service request (304); and preparing (310), in dependence upon information from the customer data source (150), a response (306) to the telecommunications service request. Typical embodiments, as shown in FIG. 3, also include transmitting (312) the response to the requesting telecommunications extension service (120).

In typical embodiments of the invention, the method is implemented in an extension application server (124), and the extension application server is coupled for data communications to a customer data source (150). In typical embodiments the extension application server is also coupled for data communications to a telecommunications server (104). In typical embodiments the telecommunications server includes a multiplicity of telecommunications extension services (106) installed and operating upon the telecommunications server.

In an example embodiment as illustrated in FIG. 3, the telecommunications server (104) is coupled for data communications to a common repository database (118). In typical embodiments, the common repository database includes information describing telecommunications services associated with telephone numbers (as shown on FIG. 5 at references 502, 504, 506, and 510), and the common repository database further includes communications parameters for extension application servers associated with telecommunications extension services (as shown on FIG. 5 at references 508 and 512).

In an example embodiment according to FIG. 3, the telecommunication extension service (120) is a Call Screener Service and the customer data source (150) includes a user workstation (128) in a customer installation. In the example case of the Call Screener Service, the service request (304) is a request for advice whether to reject the incoming call. In the example case of the Call Screener Service, preparing (310) a response includes using the destination phone number as an index into a customer data source that associates phone numbers with LAN addresses for user workstations, messaging the user at the user's workstation with a prompt in a dialogue box whether to accept the incoming phone call, and recording in a response (306) whether to reject the incoming call.

Figure 4:
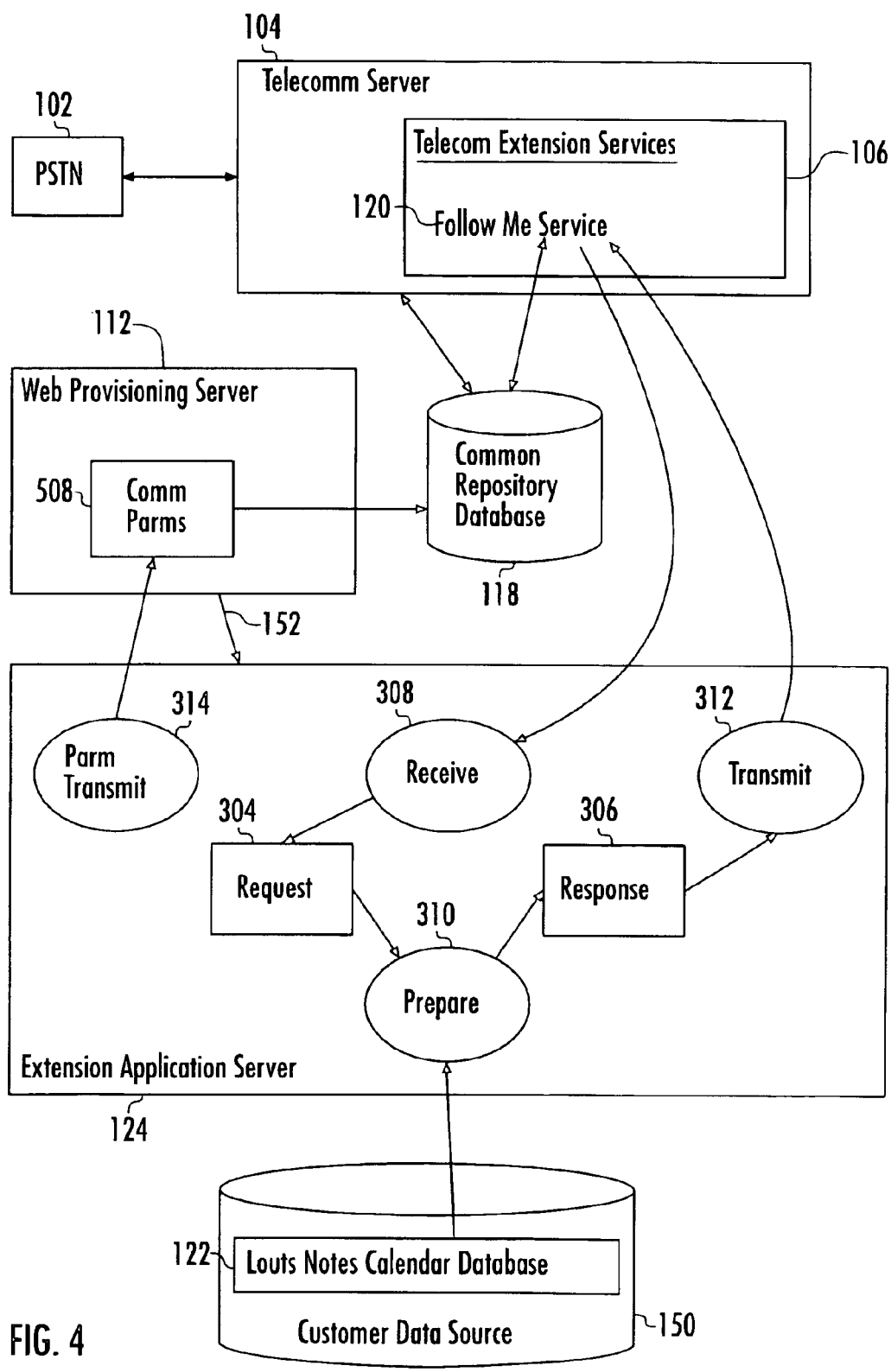
FIG. 4 is a control flow diagram showing an example embodiment of the method aspect of the invention with particular attention to a Follow Me Service as an example of a telecommunications extension service.

FIG. 4 illustrates an additional example embodiment. In typical embodiments of the kind illustrated in FIG. 4, the telecommunication extension service (108) is a Follow Me Service and the customer data source (150) includes a Lotus Notes Calendar Database (122) in a customer installation. In alternative embodiments, the customer data source is a Microsoft Outlooks database, a Microsoft Exchange database, or any other data repository containing end-user calendaring data. In typical embodiments the telecommunications server is a SLEE server, although any telecommunications server technology as will occur to those of skill in the art is well within the scope of the present invention.

Typical embodiments of the invention, as shown in FIG. 4, include downloading (152) the extension application server from a web provisioning server. Typical embodiments further include communicating (314), from the extension application server to a web provisioning server (112), data communications parameters (508) for the extension application server, wherein the data communications parameters are stored in the common repository database (118).

In an example embodiment according to FIG. 4, the telecommunication extension service (120) is a Follow Me Service, the customer data source (150) includes a Lotus Notes Calendar Database (122) in a customer installation, and the service request (304) is a request for a follow phone number, that is, for a phone number to which to forward an incoming call. In the example case of the Follow Me Service, preparing (310) a response includes using the destination phone number as an index into a calendaring database (122) in which user optionally record phone numbers for meeting locations at particular times, the user's records being indexed according to users' phone numbers; retrieving a follow phone number if there is one; and recording the follow phone in a response (306); and returning (312) the response to the telecommunications server (104) which then forwards the incoming call to the follow phone number.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method of extending telecommunications service,
    wherein the method is implemented in an extension application server in a customer installation.
    wherein the extension application server is coupled for data communications to a customer data source in the customer installation.
    wherein the extension application server is coupled for data communications to a telecommunications server,
    wherein the telecommunications server comprises, installed and operating upon the telecommunications server, a multiplicity of telecommunications extension services,
    the method comprising the steps of:
    receiving, in the extension application server, from a requesting telecommunications extension service in the telecommunications server, a telecommunications service request;
    preparing, in dependence upon information from the customer data source, a response to the telecommunications service request; and
    transmitting the response to the requesting telecommunications extension service.

2. The method of claim 1 wherein the telecommunications server is coupled for data communications to a common repository database,
    wherein the common repository database comprises information describing telecommunications services associated with telephone numbers, and
    wherein the common repository database further comprises communications parameters for extension application servers associated with telecommunications extension services.

3. The method of claim 1 wherein the telecommunication extension service is a Call Screener Service and the customer data source comprises a user workstation in the customer installation.

4. The method of claim 1 wherein the telecommunication extension service is a Follow Me Service and the customer data source comprises a Lotus Notes Calendar Database in the customer installation.

5. The method of claim 1 wherein the telecommunications server is a SLEE server.

6. The method of claim 1 further comprising downloading the extension application server from a web provisioning server.

7. The method of claim 1 further comprising communicating, from the extension application server to a web provisioning server, data communications parameters for the extension application server, wherein the data communications parameters are stored in the common repository database.

8. A system of extending telecommunications service,
wherein the system is implemented in an extension application server in a customer installation,
wherein the extension application server is coupled for data communications to a customer data source in the customer installation.
wherein the extension application server is coupled for data communications to a telecommunications server,
wherein the telecommunications server comprises, installed and operating upon the telecommunications server, a multiplicity of telecommunications extension services,
the system comprising:
means for receiving, in the extension application server, from a requesting telecommunications extension service in the telecommunications server, a telecommunications service request;
means for preparing, in dependence upon information from the customer data source, a response to the telecommunications service request; and
means for transmitting the response to the requesting telecommunications extension service.

9. The system of claim 8 wherein the telecommunications server is coupled for data communications to a common repository database,
wherein the common repository database comprises information describing telecommunications services associated with telephone numbers, and
wherein the common repository database further comprises communications parameters for extension application servers associated with telecommunications extension services.

10. The system of claim 8 wherein the telecommunication extension service is a Call Screener Service and the customer data source comprises a user workstation in a the customer installation.

11. The system of claim 8 wherein the telecommunication extension service is a Follow Me Service and the customer data source comprises a Lotus Notes Calendar Database in a the customer installation.

12. The system of claim 8 wherein the telecommunications server is a SLEE server.

13. The system of claim 8 further comprising means for downloading the extension application server from a web provisioning server.

14. The system of claim 8 further comprising means for communicating, from the extension application server to a web provisioning server, data communications parameters for the extension application server, wherein the data communications parameters are stored in the common repository database.

15. A computer program product of extending telecommunications service,
wherein the computer program product is implemented in an extension application server in a customer installation,
wherein the extension application server is coupled for data communications to a customer data source in the customer installation,
wherein the extension application server is coupled for data communications to a telecommunications server,
wherein the telecommunications server comprises, installed and operating upon the telecommunications server, a multiplicity of telecommunications extension services,
the computer program product comprising:
a recording medium;
means, recorded on the recording medium, far receiving, in the extension application server, from a requesting telecommunications extension service in the telecommunications server, a telecommunications service request;
means, recorded on the recording medium, for preparing, in dependence upon information from the customer data source, a response to the telecommunications service request; and
means, recorded on the recording medium, for transmitting the response to the requesting telecommunications extension service.

16. The computer program product of claim 15 wherein the telecommunications server is coupled for data communications to a common repository database,
wherein the common repository database comprises information describing telecommunications services associated with telephone numbers, and
wherein the common repository database further comprises communications parameters for extension application servers associated with telecommunications extension services.

17. The computer program product of claim 15 wherein the telecommunication extension service is a Call Screener Service and the customer data source comprises a user workstation in a the customer installation.

18. The computer program product of claim 15 wherein the telecommunication extension service is a Follow Me Service and the customer data source comprises a Lotus Notes Calendar Database in the customer installation.

19. The computer program product of claim 15 wherein the telecommunications server is a SLEE server.

20. The computer program product of claim 15 further comprising means, recorded on the recording medium, for downloading the extension application server from a web provisioning server.

21. The computer program product of claim 15 further comprising means, recorded on the recording medium, for communicating, from the extension application server to a web provisioning server, data communications parameters for the extension application server, wherein the data communications parameters are stored in the common repository database.

* * * * *

UNITED STATES PATENT AND TRADEMARK OFFICE
CERTIFICATE OF CORRECTION

PATENT NO. : 6,879,672 B2
DATED : April 12, 2005
INVENTOR(S) : Broussard et al.

It is certified that error appears in the above-identified patent and that said Letters Patent is hereby corrected as shown below:

Column 8,
Line 40, delete the period "." at the end of the line and insert -- ; --.

Column 9,
Line 26, delete the period "." at the end of the line and insert -- ; --.

Signed and Sealed this

Sixteenth Day of August, 2005

JON W. DUDAS
*Director of the United States Patent and Trademark Office*